(12) United States Patent
Le Blay et al.

(10) Patent No.: US 11,105,670 B2
(45) Date of Patent: Aug. 31, 2021

(54) METHOD FOR ESTIMATING A FLOW OUT OF A FLUID PUMP, ASSOCIATED CALCULATION SYSTEM AND ASSOCIATED DRILLING INSTALLATION

(71) Applicant: GEOSERVICES EQUIPEMENTS, Roissy-en-France (FR)

(72) Inventors: Florian Le Blay, Roissy-en-France (FR); Aurore Lafond, Roissy-en-Francev (FR); Nicolas Elie, Roissy-en-France (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 511 days.

(21) Appl. No.: 15/760,293

(22) PCT Filed: Sep. 14, 2016

(86) PCT No.: PCT/EP2016/001541
§ 371 (c)(1),
(2) Date: Mar. 15, 2018

(87) PCT Pub. No.: WO2017/045754
PCT Pub. Date: Mar. 23, 2017

(65) Prior Publication Data
US 2018/0259382 A1  Sep. 13, 2018

(30) Foreign Application Priority Data

Sep. 18, 2015 (EP) .................................... 15290233

(51) Int. Cl.
*G01F 9/00* (2006.01)
*F04B 51/00* (2006.01)
(Continued)

(52) U.S. Cl.
CPC .............. *G01F 9/001* (2013.01); *E21B 21/08* (2013.01); *F04B 1/06* (2013.01); *F04B 49/065* (2013.01);
(Continued)

(58) Field of Classification Search
CPC ... G01F 9/001; G01F 1/34; G01F 9/00; G01F 25/0007; G01F 1/74; G01F 25/0092;
(Continued)

(56) References Cited

U.S. PATENT DOCUMENTS 3,602,322 A * 8/1971 Gorsuch ................. E21B 21/08
175/48
8,249,826 B1 * 8/2012 Anderson ................. G01F 1/80
702/182
(Continued)

FOREIGN PATENT DOCUMENTS

WO   WO2014204316 A1   12/2014

OTHER PUBLICATIONS

Schafer et al., "An Evaluation of Flowmeters for the Detection of Kicks and Lost Circulation During Drilling", IADC/SPE 1992 Drilling Conference held in New Orleans. Louisiana, Feb. 18-21, 1992 (Year: 1992).*
(Continued)

*Primary Examiner* — Regis J Betsch

(57) ABSTRACT

The disclosure relates to a method for estimating a flow out of at least one fluid pump for injecting fluid in a well, comprising: —determining a calculation model for the flow rate of a pump exiting the at least one pump, said calculation model permitting the calculation of the flow rate in function of at least one calculation parameter (p, SPAM) related to the at least one fluid pump; then —providing at a plurality of measuring times ($t_m$), a set of measurement values ($P_{DH,m}$, $P_{B,m}$, $SPM_{DH,m}$, $SPM_{B,m}$) representative of said at least one calculation parameter; then —estimating (86) the flow rate exiting the pump in function of the model and of said at least one calculation parameter.

13 Claims, 3 Drawing Sheets

(51) Int. Cl.
  *G01F 25/00* (2006.01)
  *G01F 1/74* (2006.01)
  *E21B 21/08* (2006.01)
  *G01F 1/34* (2006.01)
  *F04B 49/06* (2006.01)
  *F04B 1/06* (2020.01)

(52) U.S. Cl.
  CPC .............. *F04B 51/00* (2013.01); *G01F 1/34* (2013.01); *G01F 9/00* (2013.01); *G01F 25/0007* (2013.01); *F04B 2205/05* (2013.01); *F04B 2205/09* (2013.01); *G01F 1/74* (2013.01); *G01F 25/0092* (2013.01)

(58) Field of Classification Search
  CPC .......... E21B 21/08; F04B 1/06; F04B 49/065; F04B 51/00; F04B 2205/05; F04B 2205/09
  See application file for complete search history.

(56) References Cited

U.S. PATENT DOCUMENTS

2013/0220600 A1\* 8/2013 Bakri .................... E21B 43/121
                                                166/250.01
2013/0298696 A1   11/2013 Singfield

OTHER PUBLICATIONS

Cayeux et al., "Toward Drilling Automation: On the Necessity of Using Sensors That Relate to Physical Models", SPE/IADC Drilling Conference and Exhibition, Amsterdam, Mar. 5-7, 2013, Revised manuscript received for review Oct. 24, 2013. Paper peer approved Jan. 30, 2014. (Year: 2014).\*
Schafer et al., An Evaluation of Flowmeters for the Detection of Kicks and Lost Circulation During Drilling, IADC/SPE 1992 Drilling Conference (Year: 1992).\*
Gerhard Vetter et al., "Pressure Pulsation Dampening Methods for Reciprocating Pumps", Proceedings of the Tenth International Pump Users Symposium, Jan. 1, 1993, pp. 25-39.
Stephen M. Price et al., "The effects of valve dynamics on reciprocating pump reliability", Prceedings of the Twelfth International Pump Users Symposium, Jan. 1, 1995, (10 pages).
John E. Purcell et al., "A Comparison of Positive displacement and centrifugal pump applications", Proceedings of the 14th international pump users symposium, Jan. 1, 1997, pp. 99-104.
International Search Report and Written Opinion issued in the related PCT application PCT/EP2016/001541, dated Dec. 22, 2016 (14 pages).
Extended Search Report issued in the related EP application 15290233.4, dated Mar. 7, 2016 (11 pages).
International Preliminary Report on Patentability issued in the related PCT application PCT/EP2016/001541, dated Mar. 29, 2018 (9 pages).

\* cited by examiner

METHOD FOR ESTIMATING A FLOW OUT OF A FLUID PUMP, ASSOCIATED CALCULATION SYSTEM AND ASSOCIATED DRILLING INSTALLATION

The present disclosure concerns a method for estimating a flow out of a fluid pump, especially of a drilling fluid pump of a drilling installation.

BACKGROUND

When drilling an oil well or a well for another effluent (in particular gas or water), it is required to accurately monitor the flow of displaced drilling fluids or muds.

The drilling fluids are mainly displaced using three-piston pumps, also known as high pressure triplex pumps, or using six-piston pumps also known as hex pumps. Due to the high-pressure constraints and to the properties of the drilling fluid, few flow meter types can be used to accurately measure the flow rate of such pumps. Moreover, such flow meters require heavy modification of the drilling rig circulation system.

It is known to calculate the volume flow rate generated by such pump on drilling rigs, considered as the flow rate injected in the drilling rig, by using the geometrical parameters of the pump (liner size, liner displacement) and a constant efficiency determined during efficiency test or assumed when no test result is available. The flow rate injected in the drilling rig is an important parameter of the rig.

SUMMARY OF THE DISCLOSURE

An object of the present disclosure is to provide a method for estimating a real-time flow out of a fluid pump, including a variable pump efficiency.

To this end, the present disclosure relates to a method of the aforementioned type, comprising: determining a calculation model for the flow rate of a pump exiting the at least one pump, said calculation model permitting the calculation of the flow rate in function of at least one calculation parameter related to the at least one fluid pump; then providing at a plurality of measuring times, a set of measurement values representative of said at least one calculation parameter; then estimating the flow rate exiting the pump in function of the model and of said at least one calculation parameter.

According to advantageous embodiments, the method comprises one or more of the following features, taken in isolation or in any technically possible combination(s):

the at least one calculation parameter is chosen among a fluid pressure at an outlet of the pump and a number of cycles of the pump per time unit;

the calculation model is a physical model such as an isothermal or adiabatic model, or an approximate mathematical model such as a $2^{nd}$-degree polynomial function;

the fluid pump is a reciprocating pump;

the method comprises, after the determination of the calculation model, a calibration procedure, including: providing, at a plurality of measuring times, a set of measurement values representative of at least one calibration parameter related to the at least one fluid pump, and then on the basis of said set of measurement values, calculating constant values of the calculation model. The constant values may be coefficients relative to the fluid, such as compressibility, or pump characteristics, such as geometrical volumes the at least one calibration parameter is representative of a flow rate measured at the exit of the wellbore;

the calibration parameters comprise a calibration parameter representative of a fluid density, and/or a calibration parameter representative of a fluid pressure at an outlet of the pump and/or a calibration parameter representative of a number of cycles of the pump per time unit;

the calibration procedure is performed in cased hole and when the at least one pump is in a stationary state;

the calibration parameters comprise at least one of the following: a mean flow rate during a predetermined time period, a mean fluid density during a predetermined time period, a mean fluid pressure at an outlet of the pump during a predetermined time period, and a mean number of cycles of the pump per time unit during a predetermined time period;

the method comprises determining, on the basis of the estimated flow rate at the exit of the pumps and of a flow rate measured at the exit of the wellbore, if there is a kick or a loss in the wellbore;

the estimation of the flow rate out of the pump is a real-time estimation.

The present disclosure also relates to a calculation system comprising a processing unit in interaction with a software application for the implementation of the method described above.

The present disclosure also relates to a drilling installation comprising: at least one fluid pump injecting fluid in the wellbore; a measurement unit for providing fluid measurement values representative of the pump, said measurement unit comprising at least one sensor able to measure at least one calculation parameter related to the pump; and a calculation system as described above.

According to advantageous embodiments, the drilling installation comprises one or more of the following features, taken in isolation or in any technically possible combination(s):

the at least one sensor comprise a pressure sensor and/or a SPM sensor;

the drilling installation comprises a discharge pipe at the exit of the wellbore, wherein the drilling installation comprises an additional measurement unit comprising a flow meter installation in the discharge pipe for measuring the fluid flow rate exiting the wellbore;

the drilling installation comprises a flow meter installation, said flow meter installation including a by-pass pipe tapped in a discharge pipe, and a flow meter, in particular a Coriolis flow meter, arranged in the by-pass pipe;

the drilling installation comprises at least two fluid pumps, said at least two fluid pumps forming a first group and a second group of at least one fluid pump, said first group being characterized by a first outlet pressure and said second group being characterized by a second outlet pressure;

the drilling installation comprises at least two pressure sensors respectively situated at the outlet of first group of pumps and second group of pumps able to measure the first outlet pressure and second outlet pressure respectively.

The present disclosure will be better understood upon reading the following description, which is given solely by way of example, and which is written with reference to the appended drawings, in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the following description, the term "downstream" is understood with respect to the normal direction of circulation of a fluid in a pipe.

Figure 1:
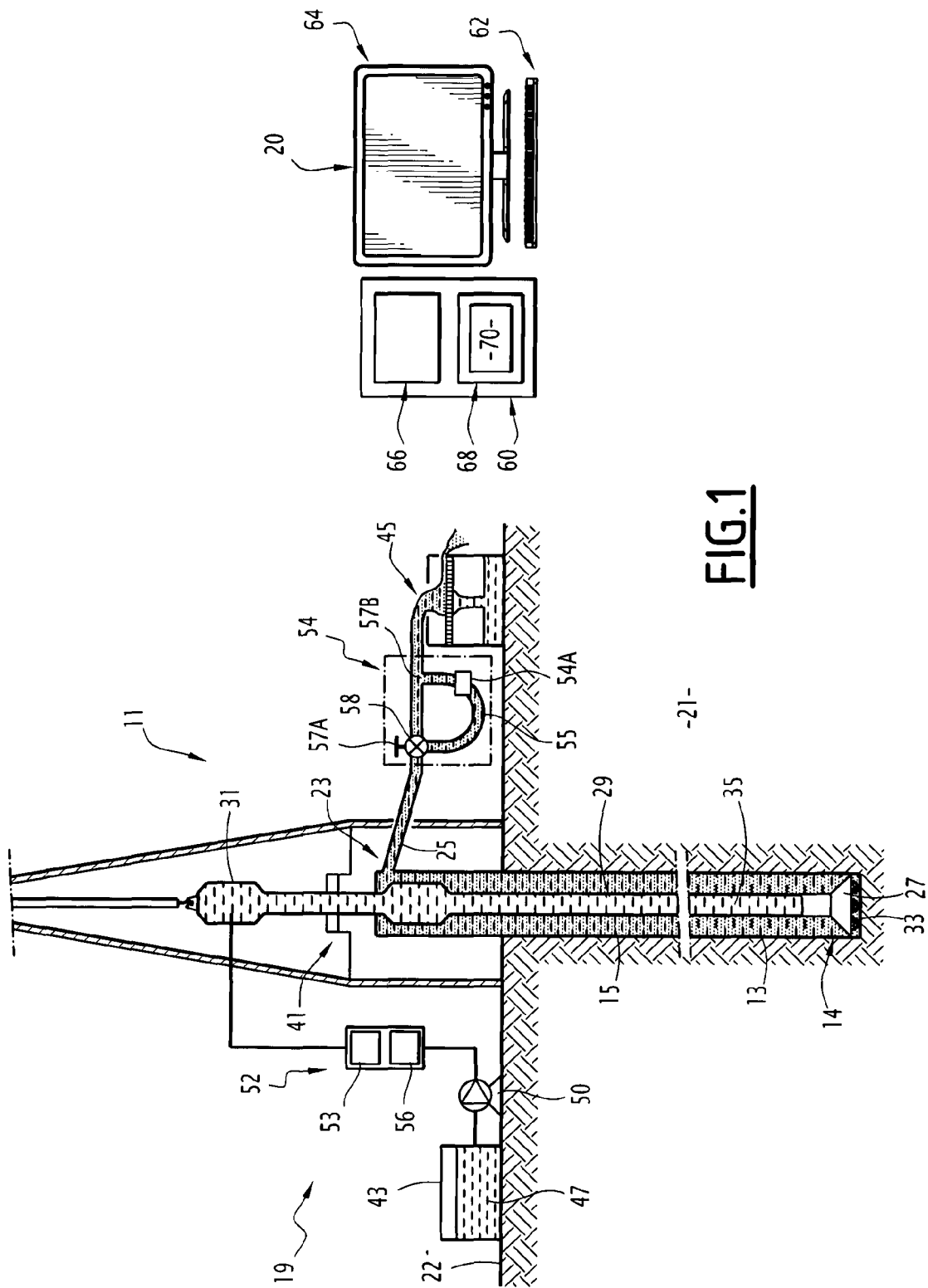
FIG. 1 is a schematic view, in vertical section, of a drilling installation according to an embodiment of the present disclosure.
Figure 2:
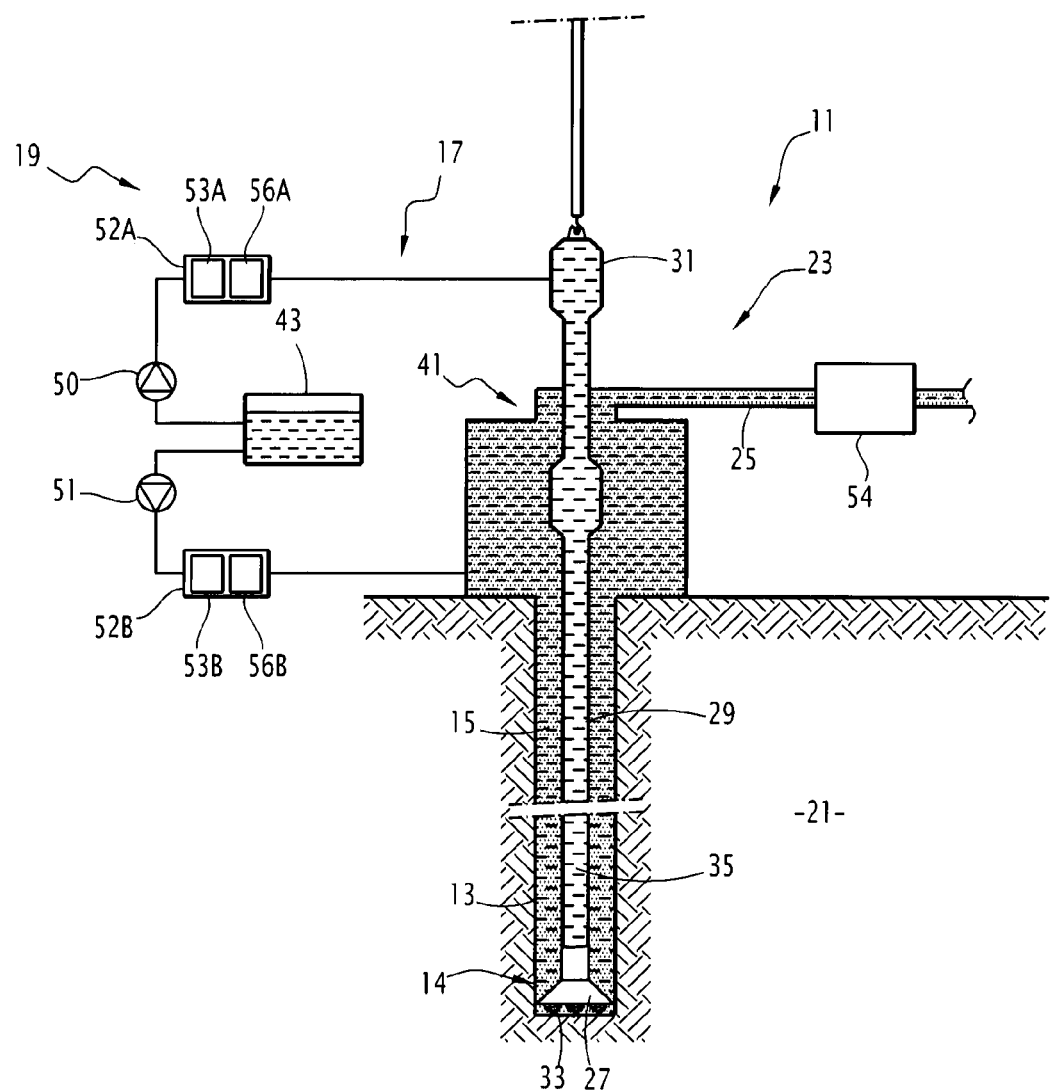
FIG. 2 is a schematic view, in vertical section, of a drilling installation according to another embodiment of the present disclosure.

Drilling installations 11 for a fluid production well, such as a hydrocarbon production well, are illustrated on FIG. 1 and FIG. 2. In the following disclosure, the same elements of the embodiments of FIGS. 1 and 2 are designated by the same reference numbers.

The drilling installation 11 of FIG. 1 or FIG. 2 comprises a drilling pipe 13 arranged in a cavity 14 bored by a rotary drilling tool 15, and a surface installation 17. The drilling installation 11 also comprises a measurement unit 19 and a calculation system 20 (not shown on FIG. 2).

The drilling pipe 13 is arranged in the cavity 14 formed in the earth formation 21 by the rotary drilling tool 15. This pipe 13 comprises, at the surface 22, a well head 23 provided with a discharge pipe 25.

The drilling tool 15 comprises a drilling head 27, a drill string 29 and a liquid injection head 31.

The drilling head 27 comprises a drill bit 33 for drilling through the rocks of the earth formation 21. It is mounted on the lower portion of the drill string 29 and is positioned in the bottom of the drilling pipe 13.

The string 29 comprises a set of hollow drilling tubes. These tubes delimit an inner space 35 which makes it possible to bring a liquid from the surface 22 to the drilling head 27. To this end, the liquid injection head 31 is screwed onto the upper portion of the string 29.

The surface installation 17 comprises a rotator 41 for supporting the drilling tool 15 and driving it in rotation, an injector 43 for injecting the drilling liquid, and a shale shaker 45 (not shown on FIG. 2) for collecting the liquid and drilling residues emerging from the discharge pipe 25.

The injector 43 is hydraulically connected to the injection head 31 in order to introduce and circulate a liquid, especially a drilling mud 47, in the inner space 35 of the drill string 29. In particular, the injector 43 comprises one or more pumps 50 to displace the drilling mud 47.

The or each pump 50 is preferably a reciprocating pump, more preferably a piston pump. For example, the pump 50 is a three-piston pump, also known as high pressure triplex pump, or a six-piston pump, also known as hex pump.

The pump 50 illustrated on FIGS. 1 and 2 is more particularly a "downhole pump" for injecting fluid via the injecting head, in the line called "standpipe".

In case of a drilling installation 11 comprising a deepwater hydraulic circuit, shown on FIG. 2, the installation 11 may also comprise another line for injecting mud in the wellbore, for instance called "booster line", the fluid being injected in this line thanks to one or several pumps called "booster pumps" 51. An installation 11 with a booster line is shown on FIG. 2.

A same kind of pump may be used either as a "downhole pump" or as a "booster pump". In other words, the same pump may be connected at a first moment to the standpipe, constituting a "downhole pump", and at a second moment to the booster line, constituting a booster "pump". In a same installation 11, the "downhole pumps" 50 have a same first outlet pressure and the "booster pumps" 51 have a same second outlet pressure.

The measurement unit 19 comprises at least one measurement device. In particular, the measurement unit 19 of FIG. 1 comprises a first measurement device 52, situated downstream of the pump or pumps 50, that is to say on the hydraulic connection between the pump or pumps 50 and the injection head 31 in case of the downhole pumps.

The measurement unit 19 comprises sensors such as sensors 53, 56 able to measure at least one parameter of the pump(s) 50 at the outlet of said pump(s) 50.

Preferably, the at least one parameter of the pump 50 may comprise the mud pressure. It may also comprise a sensor for measuring the temperature and/or the density of the mud exiting the pump. However, it is also possible to choose other parameters.

The measurement device 52 illustrated on FIG. 1 comprises a pressure sensor 53. The pressure sensor 53 may be a manometer.

The installation 11 of FIG. 2, comprising one or more "downhole pumps" 50 and one or more "booster pumps" 51, comprises two measurement units 52A, 52B, each including one pressure sensor 53A, 53B to measure respectively the outlet pressure of the downhole pumps 50 and the outlet pressure of the booster pumps 51.

The measurement device 52, 52A, 52B may also comprise a SPM sensor 56 for determining the number of cycles, or strokes, of the pump(s). This sensor may be a proximity sensor, such as a magnetic or optical sensor. Similarly, the installation comprises two measurement units 52A, 52B, each including one SPM sensor 56A, 56B to measure respectively the SPM of the downhole pumps and of the booster pumps.

The surface installation 17 also comprises another measurement unit, comprising mud flow rate sensor installation 54 for measuring the flow rate of the mud exiting the wellbore on the discharge pipe 25 (or flowline) between the exit of the wellbore and the shale shaker 45.

Preferably, as shown on FIG. 1, the mud flow rate installation 54 comprises a flow meter 54A. It is understood by "flow meter", a device for measuring the flow of a fluid or of a gas. More precisely, the flow meter 54A may be a Coriolis flow meter providing a volume flow rate based on the mass flow rate and the density of the fluid. The Coriolis flow meter is also able to measure the mud density.

For instance, the flow meter 54A is installed in a by-pass pipe 55, such as a U-shaped by-pass pipe comprising an inlet 57A opening in the discharge pipe 25 at a first tapping point and an outlet 57B also opening in the discharge point at a second tapping point situated downstream from the first tapping point. The installation 54 also comprises at least a valve 58 at the inlet 57A of the by-pass pipe and to close the discharge pipe in order all the fluid exiting the wellbore passes through the by-pass.

However, any other type of flow meter may be used for implementing the method of the disclosure, such as electromagnetic, ultrasonic, etc. The flow meter installation 54 may also be installed elsewhere in the drilling installation such as in a mud tank in which it would obtain a flow rate at the exit of the wellbore by measuring the level in the mud tanks.

The calculation system 20 is, for example, a computer.

The calculation system 20 comprises a processor 60, a man-machine interface 62 and a display unit 64.

The processor 60 comprises a processing unit 66, a memory 68 and a software application 70 stored in the memory 68. The software application 70 is configured to be executed by the processing unit 66.

The man-machine interface 62 is, for example, a touchscreen or a keyboard.

The display unit 64 is, for example, a computer screen.

The method for estimating a real-time flow out of a fluid pump according to embodiments of the disclosure will now be described, as an example, with reference to FIG. 3.

The method comprises (box 80) an initial determination of a calculation model. According to a first embodiment of the disclosure, the chosen calculation model gives the evolution of a volume exiting the pump based on at least one calculation parameter and on constant coefficients. In the first embodiment described hereinafter, the calculation model corresponds to a physical model and the constant coefficients correspond to physical parameters relative for instance to the pump geometry and/or the mud intrinsic parameters. The constant coefficients may therefore be known or be determined using fitting methods on measured data According to a second embodiment of the disclosure, the chosen calculation model relates to the real-time mud volume ejected by the pumps. In particular, this volume is supposed to be dependent on at least one parameter such as the outlet mud pressure. This calculation model in this case may be an analytical model in which the constant coefficients do not correspond to physical parameter.

Thereafter, the method optionally calibrates (box 82) the pump or pumps 50, 51 in order to determine constant coefficients of the calculation model, such as coefficients related to said pump or pumps 50, 51. The calibration is performed under predetermined conditions in which there is no gain or no loss (for instance, in cased hole and in stationary state of the pump), in order to ensure that the flow measured at the exit of the wellbore by the flow meter 54 correspond to the flow rate at the exit of the pump.

Thereafter, the method provides (box 84), at a plurality of measuring times, a set of measurement values representative of the at least one calculation parameter.

The method then estimates (box 86) the flow rate at the exit of the pump in function of the model and of the at least one calculation parameter.

It may also determine (box 88) if there is a kick or a loss in the wellbore on the basis of the flow rate measured at the exit of the wellbore and at the estimated flowrate at the exit of the pump or pumps 50. In the initial determination of a calculation model, the chosen model may be based on physical considerations, such as an isothermal model or an adiabatic model. The chosen model may also be an approximation unrelated to physical considerations such as a polynomial function. In the latter case, the calibration of the pump(s) is mandatory.

In the first embodiment, described below, the chosen model is isothermal. The pump or pumps 50, 51 which preferably comprise more than one piston, may be modeled as a plurality of single-piston pumps 90. A schematic view of a single-piston pump 90 is illustrated on FIG. 4.

The single piston pump 90 comprises a piston chamber 94 and a piston 96 movable inside said piston chamber. The pump 90 also comprises an actuator 98, suitable to move the piston 96 along an axis 100.

The piston chamber 94 comprises a displacement volume 102, corresponding to the course of the piston, and a clearance volume 104. A maximum volume or total volume of the piston chamber 94 corresponds to a sum of the displacement volume 102 and clearance volume 104.

A fluid inlet 106 and a fluid outlet 108 open into the clearance volume 104. The fluid inlet 106 and fluid outlet 108 are respectively opened and closed by a suction valve 110 and by a discharge valve 112. The suction valve 110 is configured to open at a first pressure, also called injection pressure. The discharge valve 112 is configured to open at a second pressure, also called outlet pressure.

Figure 4:
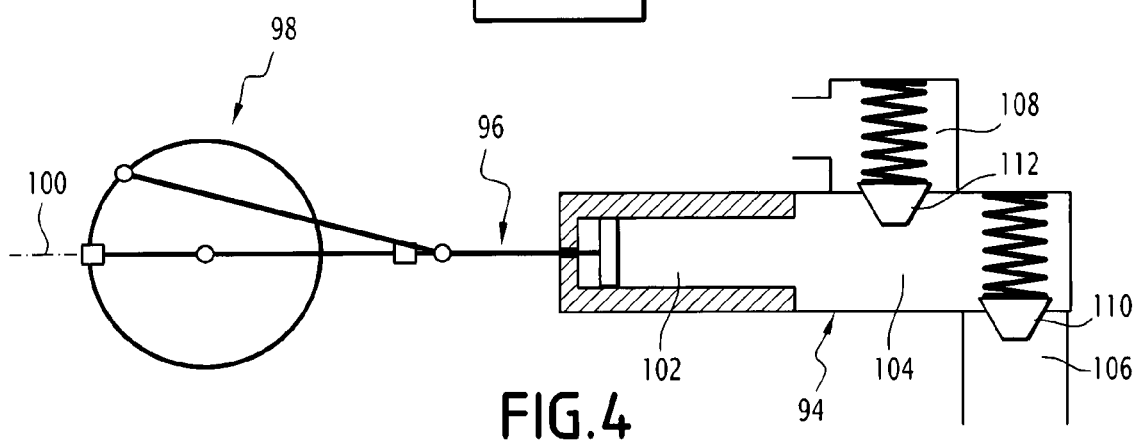
FIG. 4 is a schematic view of a single-piston pump according to the state of the art.
Figure 5:
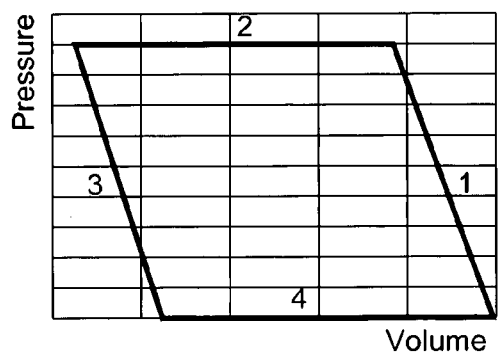
FIG. 5 is a pressure/volume diagram of the single-piston pump of FIG. 4.

The operating principle of a reciprocating pump can be split into four isothermal stages, as illustrated on FIG. 5:

1) COMPRESSION STAGE: The piston chamber 94 is full of fluid at the injection pressure and the volume of fluid corresponds to the total volume of the piston chamber 94. The suction valve 110 and discharge valve 112 being closed, the piston 96 is displaced in the direction of the clearance volume 104 to compress the fluid. The configuration of the pump on FIG. 4 is the configuration of compression stage.
2) EJECTION STAGE: Once the pressure of the chamber has reached the outlet pressure, the discharge valve 112 opens and the fluid is ejected from the pump.
3) EXPANSION STAGE: The piston chamber is full of fluid at the outlet pressure and the volume of fluid corresponds to the clearance volume 104 of the pump. The suction valve 110 and discharge valve 112 being closed, the piston 96 is displaced in the direction opposite the clearance volume 104, to decompress the fluid.
4) INJECTION STAGE: The suction valve 110 opens and the piston chamber 94 is filled up with fluid at injection pressure, until the displacement of the piston 96 is completed.

The completion of the four above-mentioned stages represents a cycle, or stroke, of the pump 90.

The first and second preferred embodiments of the determination 80 of a calculation model, will be described below. The following lexicon is used:

V Volume
T Temperature
p Pressure
Vout|T,p Volume of fluid displaced by the pump during a cycle at T and p
Vdisp/Vd Geometrical volume displaced by the piston
Vt Total volume of the piston chamber
Vc Dead volume of the piston chamber
p0 Reference pressure
$\chi$T Isothermal compressibility of the mud
pdown Pressure at the exit of the reciprocating pumps system
pin Injection pressure (at the inlet of the reciprocating pumps)
ti Observation time start
$\Delta$ti Observation time duration
pi$^-$ Mean pressure between ti and ti+$\Delta$ti
Qi$^-$ Mean flow rate between ti and ti+$\Delta$ti
Q|p0 Flow rate at reference pressure
Qout Flow rate at the exit of the reciprocating pump
Qcoriolis/Qc Flow rate measured by the Coriolis flowmeter
SPM Number of Strokes Per Minute
QDH Flow rate at the exit of the reciprocating downhole pumps system
QB Flow rate at the exit of the reciprocating booster pumps system
DH Downhole pumps
B Booster pumps

1. First Embodiment—Isothermal Volumetric Pump Efficiency

According to the theory applied here, the thermodynamic properties of the mud are affecting the pump efficiency or the volume of fluid ejected by the pump. An Equation of State (EoS) of the fluid displaced by the reciprocating pump is derived from the definition of the fluid isothermal compressibility coefficient (Equation (1)):

$$\chi_T = -\frac{1}{V}\left(\frac{\partial V}{\partial p}\right)_T \quad (1)$$

The volume exiting the pump may be obtained as follows, by modelling the pump as a single-piston reciprocating pump, as defined above:

$$V_{out}|_{P_o} = V_t e^{-\chi T(P_o-P_{in})} - V_c e^{-\chi T(P_o-P_{down})} \quad (2)$$

The real-time flow rate out of the reciprocating pump 90 at time $t_i$ may then be determined as follows:

$$Q_{out}|_{P_o,i} = (V_t e^{-\chi T(P_o-P_{in})} - V_c e^{-\chi T(P_o-P_{down,i})})SPM_i \quad (3)$$

where $Q_{out}|_{P_o,i}$ is the real-time flow rate out of the reciprocating pump 90 at time $t_i$, $p_{down,i}$ is the real-time pressure out of the reciprocating pump 90 at time $t_i$ and $SPM_i$ is the real-time SPM of the reciprocating pump 90 at time $t_i$.

The calculation model determined hereabove is obtained from the physical estimation of the volume out of the pump but it may also be obtained from an estimation of a pump efficiency.

The calculation model has also been set up with injection of fluid in the wellbore via a downhole pump only.

However, it may be adapted to an installation with several downhole pumps. Indeed, the pump or pumps 50 of the installation 11 of FIG. 1 have the same characteristic volumes. In other terms, the pump or pumps 50 of the installation 11 are modeled by a plurality of single-piston pumps 90 with the same displacement volume 102 and the same clearance volume 104. They may be modelled by one equivalent downhole pump with the same characteristic volumes as each of the downhole pumps of the installation 11. This one equivalent downhole pump is pumping at a certain SPM, equal to the sum of the SPM of all the downhole pumps of the installation 11. With such a model, the calculation model as set forth above may be applicable to a drilling rig comprising a plurality of downhole pumps.

As shown on FIG. 2, the installation 11 may also comprise at least two types of pumps 50, 51, one or some of which having a same first outlet pressure $p_{DH}$, and one or some of which having a same second outlet pressure $p_B$. In the following disclosure, it is considered that the first outlet pressure characterizes a first group of pumps called "downhole pumps" 50 and injecting mud in the wellbore via the standpipe that the second outlet pressure characterizes a second group of pumps called "booster pumps" 51 and injecting fluid in the wellbore in parallel of the downhole pumps, via the booster line. The measurement unit 19 comprises two pressure sensors 56A and 56B, to measure the outlet pressures $p_{DH}$, $p_B$ respectively of the first group of downhole pumps and of the second group of booster pumps, each of the sensors being situated between the exit of the pump and the entry of the fluid in the wellbore, generally at the surface.

In the same manner, if there are several booster pumps in the drilling rig, they may be modelled by one equivalent booster pump with the same efficiency and characteristic volumes as each of the booster pumps. This equivalent booster pump is pumping at a certain SPM, $SPM_B$, equal to the sum of the SPM of all the booster pumps of the installation 11.

In case of a more complex drilling rig installation modelled as explained above, the following equations are obtained:

$$V_{t,equivalent\ downhole\ pump} = V_t = V_{t,equivalent\ booster\ pump}$$

$$V_{c,equivalent\ downhole\ pump} = V_c = V_{c,equivalent\ booster\ pump} \quad (4)$$

$$SPM_{DH} = SPM_{equivalent\ downhole\ pump} = \Sigma_j SPM_j \quad (5)$$

$$SPM_B = SPM_{equivalent\ booster\ pump} = \Sigma_k SPM_k \quad (6)$$

where j accounts for each downhole pump, and k accounts for each booster pump.

Thus, the calculation model representing the real-time flow rates at the exit of the downhole-pump system and booster-pump system can be expressed as follows:

$$Q_{DH}|_{P_o,i} = (V_t e^{-\chi T(P_o-P_{in})} - V_c e^{-\chi T(P_o-P_{DH,i})})SPM_{DH,i} \quad (7)$$

$$Q_B|_{P_o,i} = (V_t e^{-\chi T(P_o-P_{in})} - V_c e^{-\chi T(P_o-P_{B,i})})SPM_{B,i} \quad (8)$$

where $p_{DH,i}$ is the real-time pressure out of the downhole pumps system at time $t_i$, $SPM_{DH,i}$ is the real-time SPM of the equivalent downhole pump at time $t_i$, $p_{B,i}$ is the real-time pressure out of the booster pumps system at time $t_i$ and $SPM_{B,i}$ is the real-time SPM of the equivalent booster pump at time $t_i$ The calculation model may also adapt to any other pump configuration, for instance a wellbore comprising another additional line. A different model may also take into account pumps with different geometrical characteristics.

Figure 3:
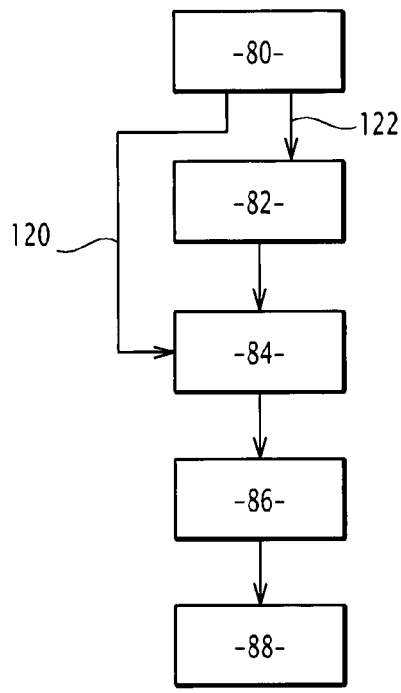
FIG. 3 is an organization chart of a method according to the an embodiment of the disclosure.

As the values of $V_c$, $V_t$ and $\chi_T$ depending on the pump ($V_c$, $V_t$) and on the mud ($\chi_T$) are generally known, the equations (7) and (8) above can be used for the next operations 84, 86 of real-time estimation of the pump system, as illustrated by arrow 120 on FIG. 3.

In order to determine the pump and mud characteristics when they are unknown or when the accuracy of these parameters is not sufficient, a calibration may be performed as illustrated by arrow 122 on FIG. 3. Operations 82, 84 and 86 will be explained below.

2. Second Embodiment—Pump Out Displaced Mud Volume Model

The second embodiment, described hereafter, of the determination of a calculation model, has less modeling complexity than the first embodiment previously described.

The flow rates at the exit of equivalent downhole pump and equivalent booster pump is related to the effective mud volume ejected from the pumps during one cycle and the number of strokes per minutes of each drilling pump j and each booster pump k (measured data from the pump stroke counters).

$$Q_{DH}|_{P_{o,i}} = (V_{out,DH}|_{P_{o,i}})\text{SPM}_{DH,i} \qquad (9)$$

$$Q_B|_{P_{o,i}} = (V_{out,B}|_{P_{o,i}})\text{SPM}_{B,i} \qquad (10)$$

where $V_{out}|_{p_{0,i}}$ is the real time volume of fluid displaced by each pump during one cycle at time $t_i$, $\text{SPM}_{DH,i}$ is the real time SPM of the equivalent downhole pump at time $t_i$ and $\text{SPM}_{B,i}$ is the real time SPM of the equivalent booster pump at time $t_i$.

The effective volume of mud ejected from each pump during one cycle depends on the pressure outside of the pumps. From the observation of field results, it has been enlightened that this function can be approximated by a function, such as a polynomial function of degree two:

$$V_{out}|_{p_{o,i}} = \beta_0 P_{down,i}^2 + \beta_1 P_{down,i} + \beta_2 \qquad (11)$$

The three coefficients $\beta_0$, $\beta_1$ and $\beta_2$ are not known a priori. Thus a calibration 82 may be carried out to express $\beta_0$, $\beta_1$ and $\beta_2$. In case there are several pumps, as all the pumps 90 are supposed to be identical, these three coefficients are the same for each pump. As also explained above, other function may adapt to a configuration where there is only one type of pumps in the wellbore or pumps with different geometrical characteristics, or any other pump configuration.

It will now be explained how the calibration 82 is carried out. It may be carried out after a determination of the model according to the first or to the second embodiment.

A real-time measured flow rate (corresponding to the Coriolis flow rate QCoriolis|$p_0$) is measured by the Coriolis flow meter 54 on the flow line. The Coriolis flow meter 54 is situated downstream of the booster pumps and downhole pumps 50, at the exit of the wellbore, as already explained. Therefore, during the calibration procedure, it can be assumed that the flow rate measured by the Coriolis flow meter 54 corresponds to the sum of the flow rates out of the downhole pumps system and out of the booster pumps system. This hypothesis is correct if there is no gain and loss in the well, such as when the calibration is performed in cased hole and in a stationary state of the pumps: these conditions ensure there is no gain and loss in the well and during steady states.

The objective of the calibration procedure is to find the unknown constant values $\beta_0$, $\beta_1$ and $\beta_2$ such that the analytical expression of the flow rates outside of the pumps (coming from the pump displaced mud volume model) equals the measured flow rate by the Coriolis flow meter. This equality must be verified on mean flow rate values over several stages:

$$\overline{Q_{\text{Coriolis}}|_{p_o,i}} = \overline{Q_{DH,analytical2}|_{p_o,i}} + \overline{Q_{B,analytical2}|_{p_o,i}} \qquad (12)$$

where $\overline{Q|_{p_o,i}}$ is the mean flow rate between $t_i$ and $t_i+\Delta t_i$, $\Delta t_i$ being the time length of a fitting stage.

In other terms, in the first embodiment, the objective is to find the constant values $V_t$, $V_c$ and $\chi_T$ such that the next equality is verified for different calibration stages $\Delta t_i$:

$$\overline{Q_C|_{p_0,i}} = \left(V_t e^{-\chi_T(p_o - p_{in})} - V_c e^{-\chi_T(p_o - \overline{p_{DH,i}})}\right)\overline{\text{SPM}_{DH,i}} + \qquad (13)$$
$$\left(V_t e^{-\chi_T(p_o - p_{in})} - V_c e^{-\chi_T(p_o - \overline{p_{B,i}})}\right)\overline{\text{SPM}_{B,i}}$$

In other terms, in the second embodiment, the objective is to find the constant values $\beta_0$, $\beta_1$ and $\beta_2$ such that the next equality is verified for different calibration stages $\Delta t_i$:

$$\overline{Q_C|_{p_0,i}} = \qquad (14)$$
$$(\beta_0 \overline{p_{DH,i}}^2 + \beta_1 \overline{p_{DH,i}} + \beta_2)\overline{\text{SPM}_{DH,i}} + (\beta_0 \overline{p_{B,i}}^2 + \beta_1 \overline{p_{B,i}} + \beta_2)\overline{\text{SPM}_{B,i}}$$

where $\overline{p_i}$ is the average outlet pressure between $t_i$ and $t_i+\Delta t_i$ and $\overline{\text{SPM}_i}$ is the average Strokes Per Minutes between $t_i$ and $t_i+\Delta t_i$.

In the calibration 82 of the first and second embodiments described above, the data are preferably acquired for at least 5 different SPM. Preferably, the value $\Delta t_i$ is at least 10 minutes.

During the calibration 82, a calibration algorithm is processed by the calculation system 20. The inputs of the calibration algorithm are the measured volume flow rate (from the Coriolis flow meter 54), the pressure $p_{DH,i}$, $p_{B,i}$ downstream of the pumps (from the pressure sensors 56 of the downhole pumps and booster pumps) and the SPM $\text{SPM}_{DH,i}$, $\text{SPM}_{B,i}$, of all the pumps. When the calibration algorithm is different, other parameters such as the mud density, etc. may also be taken into account to determine the constant values.

For the first embodiment, the outputs of the algorithm are the three constant values $V_c$, $V_t$ and $\chi_T$, that is to say the clearance volume 104 and the total volume (102+104) of pump 90, and the mud compressibility.

For the second embodiment, the outputs of the algorithm are the three coefficients $\beta_0$, $\beta_1$ and $\beta_2$.

The calibration algorithm may be determined from any known inversion method, such as a linear regression.

After the calibration 82, the real-time estimation of the pump system is carried out.

The method comprises providing (box 84), at a plurality of measuring times $t_m$, a set of measurement values representative of the calculation parameters used in the calculation models. According to the first and second embodiments described above, the concerned parameters are the first and second outlet pressures $p_{DH,m}$, $p_{B,m}$ respectively of the downhole pumps and booster pumps, and the first and second SPM $\text{SPM}_{DH,m}$, $\text{SPM}_{B,m}$ respectively of the downhole pumps and booster pumps. The pressures are given by the pressure sensors 53 while the SPMs are given by the proximity sensors 56.

A calculation algorithm is processed (box 86) by the calculation system 20, according to the equations described above by the calculation model 80 and according to the constant values/coefficients determined during calibration 82.

The inputs of the algorithm are the first and second outlet pressures and the first and second SPM. The outputs of the algorithm are the real-time flow rates out of the downhole pumps and out of the booster pumps.

Once the flow rate of mud exiting the pump has been determined, the method comprises (box 88) determining if there is a kick or between the measured flow rate at the exit of the wellbore and the flow rate at the exit of the pumps, corresponding to the flow rate at the inlet of the wellbore indeed enables to determine if there is a kick, in other terms fluid coming from the wellbore (in which case the flow measured at the exit of the wellbore is greater than the one measured at the inlet of the wellbore), or a loss of fluid in the wellbore (in which case the flow measured at the exit of the wellbore is lesser than the one measured at the inlet of the wellbore) a loss in the wellbore based on the measured flow rate at the exit of the wellbore (measured by the flow meter 54) and on the calculated flow rate at the exit of the pumps.

The invention claimed is:

1. A method for estimating a flow out of at least one fluid pump, wherein the fluid pump is configured for injecting fluid in a wellbore and is situated upstream of an entry of fluid into the wellbore, comprising:
   determining a calculation model for the flow rate of a pump exiting the at least one pump, said calculation model permitting the calculation of the flow rate as a function of at least one calculation parameter related to the at least one fluid pump; then
   providing at a plurality of measuring times, a set of measurement values representative of said at least one calculation parameter; then
   estimating the flow rate exiting the pump as a function of the model and of said at least one calculation parameter, wherein the method further comprises, after the determination of the calculation model, a calibration procedure including:
   providing, at a plurality of measuring times, first measurement values related to the at least one fluid pump and second measurement values of a flow rate measured at the exit of the wellbore, and
   on the basis of said first and second measurement values, calculating constant values of the calculation model.

2. The method according to claim 1, wherein the at least one calculation parameter is a fluid pressure at an outlet of the pump or a number of cycles of the pump per time unit.

3. The method according to claim 1, wherein the constant values are coefficients relative to the fluid or the pump characteristics.

4. The method according to claim 1, wherein the first measurement values comprise values representative of a fluid density, and/or values representative of a fluid pressure at an outlet of the pump, and/or values representative of a number of cycles of the pump per time unit.

5. The method according to claim 1, wherein the calibration procedure is performed in a cased hole when the at least one pump is in a stationary state.

6. The method according to claim 1, wherein the first measurement values comprise at least one of the following:
   A mean fluid density during a predetermined time period,
   A mean fluid pressure at an outlet of the pump during a predetermined time period, or
   A mean number of cycles of the pump per time unit during a predetermined time period.

7. The method according to claim 1, comprising determining, on the basis of the estimated flow rate at the exit of the pumps and of a flow rate measured at the exit of the wellbore, if there is a kick or a loss in the wellbore.

8. The method according to claim 1, wherein the estimation of the flow rate out of the pump is a real-time estimation.

9. A calculation system comprising a processing unit in interaction with a software application for the implementation of the method according to claim 1.

10. A drilling installation comprising:
    at least one fluid pump configured for injecting fluid in the wellbore;
    a first measurement unit for providing fluid measurement values representative of the pump, said measurement unit comprising at least one sensor able to measure at least one calculation parameter related to the pump;
    a discharge pipe at the exit of the wellbore,
    a second measurement unit comprising a flow meter installation in the discharge pipe for measuring the fluid flow rate exiting the wellbore; and
    a calculation system according to claim 9.

11. The drilling installation according to claim 10, wherein the sensor comprises a pressure sensor and/or a sensor for determining a number of cycles of the pump per time unit.

12. The drilling installation according to claim 10, comprising at least two fluid pumps, said at least two fluid pumps forming a first group and a second group of at least one fluid pump, said first group being characterized by a first outlet pressure and said second group being characterized by a second outlet pressure.

13. The method according to claim 1, wherein the second measurement values comprise a mean flow rate during a predetermined time period.

* * * * *